United States Patent
Mishra et al.

(10) Patent No.: US 10,963,035 B2
(45) Date of Patent: Mar. 30, 2021

(54) LOW POWER PCIE

(71) Applicant: QUALCOMM Incorporated, San Diego, CA (US)

(72) Inventors: Lalan Jee Mishra, San Diego, CA (US); James Lionel Panian, San Diego, CA (US); Richard Dominic Wietfeldt, San Diego, CA (US); Mohit Kishore Prasad, San Diego, CA (US); Amit Gil, Zichron Yaakov (IL); Shaul Yohai Yifrach, Haifa (IL)

(73) Assignee: QUALCOMM Incorporated, San Diego, CA (US)

(*) Notice: Subject to any disclaimer, the term of this patent is extended or adjusted under 35 U.S.C. 154(b) by 86 days.

(21) Appl. No.: 16/155,824

(22) Filed: Oct. 9, 2018

(65) Prior Publication Data

US 2019/0107882 A1 Apr. 11, 2019

Related U.S. Application Data

(60) Provisional application No. 62/570,824, filed on Oct. 11, 2017.

(51) Int. Cl.
G06F 1/3234 (2019.01)
G06F 13/40 (2006.01)
G06F 13/10 (2006.01)
G06F 1/3206 (2019.01)

(52) U.S. Cl.
CPC .......... *G06F 1/3253* (2013.01); *G06F 1/3206* (2013.01); *G06F 13/102* (2013.01); *G06F 13/4022* (2013.01); *G06F 13/4072* (2013.01); *G06F 13/4086* (2013.01)

(58) Field of Classification Search
CPC .... G06F 1/3253; G06F 1/3206; G06F 13/102; G06F 13/4022; G06F 13/4072; G06F 13/4086
See application file for complete search history.

(56) References Cited

U.S. PATENT DOCUMENTS

| | | | | |
|---|---|---|---|---|
| 6,243,776 B1* | 6/2001 | Lattimore | ........... | G06F 13/4072 710/104 |
| 6,701,280 B2* | 3/2004 | Home | ..................... | G04F 10/00 327/108 |
| 7,257,655 B1* | 8/2007 | Burney | ................. | G06F 13/423 370/408 |

(Continued)

OTHER PUBLICATIONS

International Search Report and Written Opinion—PCT/US2018/055197—ISA/EPO—dated Feb. 16, 2016.

*Primary Examiner* — Aurel Prifti

(57) ABSTRACT

A system for low-speed Peripheral Component Interconnect (PCI) Express (PCIe) systems, while maintaining both lower level physical layer (PHY) pin requirements and upper layer functionality being capable of both differential and single-ended signaling modes optimized for power savings. An apparatus includes an integrated circuit (IC) adapted to be connected to a Peripheral Component Interconnect (PCI) Express (PCIe) bus. The IC includes a control block selects between differential and single-ended signaling for the PCIe bus. The single-ended signaling is transmitted through existing pins of the IC that are coupled to the PCIe bus for differential signaling when single-ended signaling is selected for the PCIe bus.

13 Claims, 17 Drawing Sheets

(56) References Cited

U.S. PATENT DOCUMENTS

| | | | |
|---|---|---|---|
| 7,916,750 B2* | 3/2011 | Das Sharma | G06F 13/4221 370/469 |
| 7,949,809 B2* | 5/2011 | Li | G06F 13/385 370/469 |
| 9,467,120 B1* | 10/2016 | Song | G06F 1/3237 |
| 9,477,630 B2 | 10/2016 | Reinke et al. | |
| 9,537,644 B2* | 1/2017 | Jones | G09G 5/006 |
| 9,575,552 B2* | 2/2017 | Por | G06F 1/266 |
| 9,720,866 B2* | 8/2017 | Hamada | G06F 13/4282 |
| 2005/0259685 A1* | 11/2005 | Chang | H04W 88/06 370/469 |
| 2006/0010272 A1* | 1/2006 | Solomon | G06F 13/4022 710/105 |
| 2006/0095613 A1* | 5/2006 | Venkata | G06F 13/385 710/62 |
| 2006/0114918 A1* | 6/2006 | Ikeda | H04L 45/02 370/408 |
| 2006/0277339 A1* | 12/2006 | Sakaki | G06F 13/385 710/62 |
| 2006/0282601 A1* | 12/2006 | Uchida | G06F 1/3287 710/309 |
| 2007/0182456 A1* | 8/2007 | Agarwal | H03K 19/1732 326/101 |
| 2012/0068735 A1* | 3/2012 | Harriman | G06F 13/385 326/63 |
| 2012/0191887 A1* | 7/2012 | Yamauchi | G06F 13/4282 710/106 |
| 2012/0246505 A1* | 9/2012 | Ma | G06F 1/3203 713/324 |
| 2013/0054841 A1* | 2/2013 | Padia | G06F 13/102 710/5 |
| 2013/0275792 A1* | 10/2013 | Tabatabai | G06F 1/3203 713/323 |
| 2014/0037027 A1* | 2/2014 | Haq | H04L 27/0008 375/340 |
| 2014/0112339 A1* | 4/2014 | Safranek | G06F 13/4282 370/389 |
| 2015/0012677 A1* | 1/2015 | Nagarajan | G06F 13/37 710/106 |
| 2015/0186319 A1 | 7/2015 | Blevins et al. | |
| 2015/0205745 A1 | 7/2015 | Bailey et al. | |
| 2015/0269109 A1* | 9/2015 | Spry | G06F 13/4221 710/105 |
| 2015/0370315 A1* | 12/2015 | Unnikrishnan | G06F 13/4282 713/323 |
| 2016/0034025 A1* | 2/2016 | Dabral | G06F 1/3296 710/313 |
| 2016/0179738 A1* | 6/2016 | Guddeti | G06F 11/3027 714/56 |
| 2016/0216758 A1* | 7/2016 | Kachare | G06F 3/0679 |
| 2016/0299862 A1* | 10/2016 | Corbin | G06F 13/102 |
| 2016/0335222 A1 | 11/2016 | Schnell et al. | |
| 2016/0363980 A1* | 12/2016 | Spiel | G06F 1/3206 |
| 2017/0017595 A1* | 1/2017 | Schnell | G06F 13/4022 |
| 2017/0083475 A1* | 3/2017 | Wu | G06F 13/4273 |
| 2017/0200482 A1* | 7/2017 | Fox | G11C 7/22 |
| 2017/0344506 A1* | 11/2017 | Park | G06F 13/4282 |
| 2017/0344512 A1* | 11/2017 | Jen | G06F 13/4068 |
| 2018/0276164 A1* | 9/2018 | Das Sharma | H01L 23/5386 |
| 2018/0365188 A1* | 12/2018 | Srivastava | G06F 13/4045 |
| 2019/0138470 A1* | 5/2019 | Li | G06F 13/14 |

\* cited by examiner

US 10,963,035 B2

LOW POWER PCIE

CROSS-REFERENCE TO RELATED APPLICATIONS

The present Application for Patent claims the benefit of U.S. Provisional Application No. 62/570,824, entitled "LOW POWER PCIe," filed Oct. 11, 2017, assigned to the assignee hereof, and expressly incorporated herein by reference in its entirety.

FIELD OF THE DISCLOSURE

The present disclosure relates generally to peripheral communications interfaces, and more particularly to techniques for managing power in a Peripheral Component Interconnect Express interface.

BACKGROUND

Mobile communication devices may include a variety of components including circuit boards, integrated circuit (IC) devices and/or System-on-Chip (SoC) devices. The components may include processing circuits, user interface components, storage and other peripheral components. Communication between components may be implemented using a bus operated in compliance standards-defined specifications and protocols. In one example, the Peripheral Component Interconnect Express (PCIe) interface provides a point-to-point topology, with separate serial links connecting every device to the root complex (sometimes referred to as "host").

Battery-operated devices, including certain mobile communication devices, are typically designed to meet increasingly tighter power consumption budgets in order to maximize battery lifetime. The PCIe interface supports power management schemes that disable and/or power-down bus interface circuits to conserve power when a PCIe link is idle. These power management schemes can introduce significant data communication latencies related to the time required to enter and exit low-power states. However, part of the popularity of the PCIe protocol is based on the fact that PCIe is engineered to support a variety of speeds including speeds as high as plural gigabits per second, wherein power saving is an ancillary feature.

While the PCIe protocol is capable of supporting high speeds, it may also be used to support low-speed links, but does so at the expense of power savings. With the fast-emerging class of 5G IoT devices with very wide variation of link throughput requirements, it is imperative to have PHY connections that can bring power and architecture benefits while maintaining the upper layers of the existing PCIe stack, especially for latency sensitive applications.

SUMMARY

Aspects disclosed in the detailed description include a system for low-speed Peripheral Component Interconnect (PCI) Express (PCIe) systems, while maintaining both lower level physical layer (PHY) pin requirements and upper layer functionality. In an exemplary aspect, the PHY contains a configurable control block capable of selecting either differential or single-ended signaling. Being able to switch between differential and single-ended signaling will allow for a more power efficient communication for devices that operate at lower speeds (i.e., 10-100s Mbps). In some examples, the selecting is determined by at least a throughput estimation or a battery status.

Aspects disclosed in the detailed description include the ability to configure between the PCIe differential signaling mode and a single-ended digital signaling mode to help optimize power. In an exemplary aspect, a PHY of a conventional PCIe system containing a Physical Coding Sub-Layer (PCS) and a Physical Media Attachment Layer (PMA) that communicate over a differential signaling mode transitions to another Physical Coding Sub-Layer (PCS) and another Physical Media Attachment Layer (PMA) that is capable of communicating over a single-ended signaling mode. In another exemplary aspect, a PHY of a conventional PCIe system contain a Configurable Physical Coding Sub-Layer (C-PCS) and a first Configurable Physical Media Attachment Layer (C-PMA) that perform both differential signaling mode and single-ended signaling mode depending upon which mode is needed. In yet another exemplary aspect, a PHY of a conventional PCIe system contains a mechanism to transition termination pins from a positive to negative setting. In yet another exemplary aspect, a PHY of a conventional PCIe system contains a mechanism to transition side band signaling to an in band signaling mechanism during single-ended signaling mode. In another exemplary aspect, an IC of a conventional PCIe system contains a mechanism wherein the control logic layer manages the switch between differential and single-ended signaling mode.

DETAILED DESCRIPTION

Figure 1:
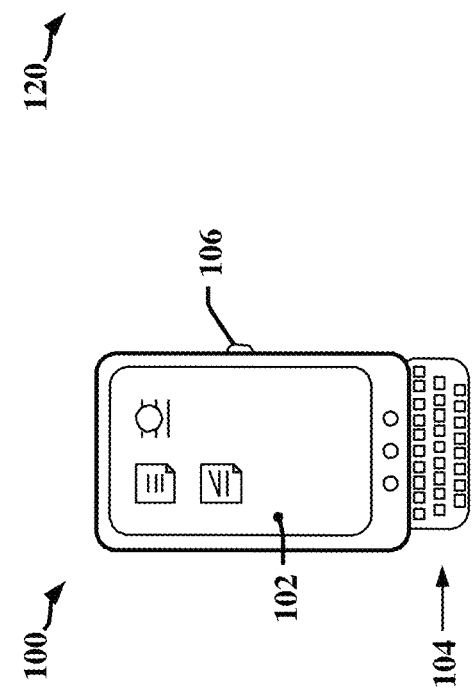
FIG. 1 illustrates a block diagram of an exemplary processor-based system that may be adapted according to certain aspects disclosed herein.
Figure 1:
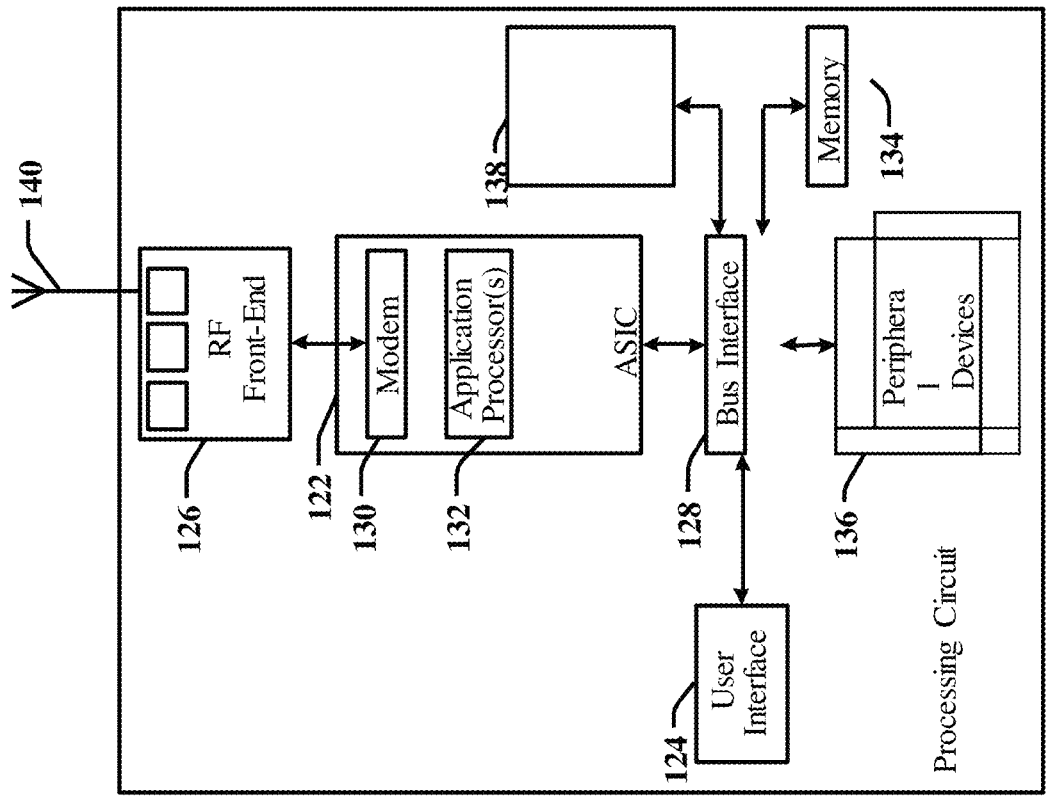

The detailed description set forth below in connection with the appended drawings is intended as a description of various configurations and is not intended to represent the only configurations in which the concepts described herein may be practiced. With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Computing systems often employ a local bus to connect processors with memory, IC devices, circuits, peripherals, etc. The PCIe interface provides a standardized interface that enables a processor to communicate with a variety of different devices. In some examples, the devices may be provided in a mobile processing device or mobile communication device that communicates over a radio frequency (RF) access network such as a cellular telecommunication network, a local area network based on the Institute of Electrical and Electronics Engineers (IEEE) 802.11 standards, or the like. In some instances, the PCIe interface supports high-speed interconnects that can be deployed within or between IC devices used for RF transceivers, modems, and other components that may be part of a mobile communications device. Mobile communication devices are often subject to power budgets and a PCIe interface may be operated such that transmitters and receivers are powered-down between transmissions. The time required to enter into and exit from a low-power mode of operation can increase the latency of a communication link, where latency may be a measurement of the time interval between receiving a request and transmitting a response to the request. Certain aspects disclosed herein relate to power management of the PCIe interface that can optimize power consumption while maintaining low latency.

According to certain aspects, a PCIe bus may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device. FIG. 1 depicts an example of such an apparatus 100. The apparatus 100 may include a processing circuit 120 having multiple devices or circuits 122, 124, 126, 128, 136, and/or 138. The processing circuit 120 may be implemented in an application-specific IC (ASIC) or SoC that may include multiple devices or circuits 122, 124, 126, 128, 136, and/or 138. In one example, the apparatus 100 may be a communication device and the processing circuit 120 may include an RF front-end circuit 126 that enables the apparatus to communicate through one or more antennas 140 with a radio access network, a core access network, the Internet and/or another network.

In the example illustrated in FIG. 1, the processing circuit 120 includes an application-specific integrated circuit (ASIC) device 122 that has one or more processors 132, one or more modems 130, and/or other logic circuits or functions. The processing circuit 120 may be controlled by an operating system and may provide an application programming interface (API) layer that enables the one or more processors 132 to execute software modules residing in the memory device 134, for example. The software modules may include instructions and data stored in a processor readable storage such as the memory device 134. The ASIC device 122 may access its internal memory, the memory device 134 of the processing circuit 120, and/or external memory. Memory may include read-only memory (ROM) or random-access memory (RAM), electrically erasable programmable ROM (EEPROM), flash cards, or any memory device that can be used in processing systems and computing platforms. The processing circuit 120 may include, or have access to a local database or other parameter storage that can maintain operational parameters and other information used to configure and operate the apparatus 100 and/or the processing circuit 120. The local database may be implemented using registers, a database module, flash memory, magnetic media, EEPROM, optical media, tape, soft or hard disk, or the like. The processing circuit 120 may also be operably coupled to external devices such as the antennas 140, a display 102, operator controls, such as a button 106 and/or an integrated or external keypad 104, among other components. A user interface 124 may communicate with the display 102, keypad 104, etc. through a dedicated communication link 138 or through one or more PCIe interconnects.

The processing circuit 120 may communicate through a bus interface circuit 128, which may include a combination of circuits, counters, timers, control logic and other configurable circuits or modules. In one example, the bus interface circuit 128 may be configured to operate in accordance with PCIe specifications and protocols. The processing circuit 120 may include or control a power management function that configures and manages the bus interface circuit 128, the user interface 124, the RF front-end circuit 126, and the operation of one or more application processors 132 resident in the ASIC device 122, for example. In certain modes of operation, the bus interface circuit 128 may be configured to transition between power states based on activity of the bus interface circuit 128.

Figure 2:
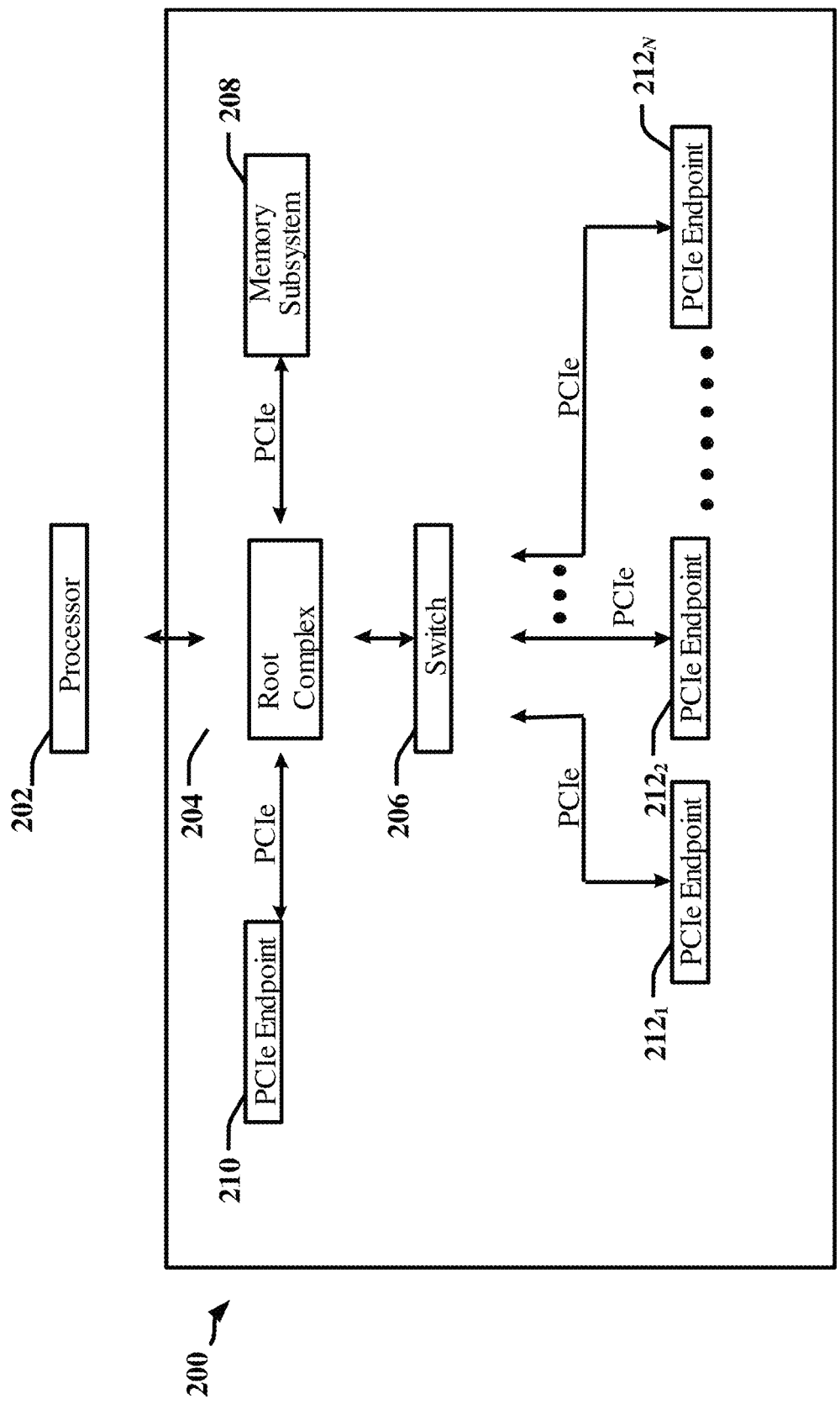
FIG. 2 illustrates an example of an architecture for a Peripheral Component Interconnect (PCI) Express (PCIe) interface.

PCIe interfaces operate using multiple high-speed serial links. The PCIe interfaces may be characterized as having a point-to-point topology, where separate serial links connect each device to a host, or root complex. FIG. 2 is a block diagram illustrating an example of an architecture for a PCIe interface 200. In the PCIe interface 200, the root complex 204 couples a processor 202 to memory devices (e.g. the memory subsystem 208) and a PCIe switch circuit 206. In some instances, the switch circuit 206 includes cascaded switch devices. One or more PCIe endpoint devices 210 may be coupled directly to the root complex 204, while other PCIe endpoint devices $212_1, 212_2, \ldots 212_N$ may be coupled to the root complex 204 through the PCIe switch circuit 206. The root complex 204 may be coupled to the processor 202 using a proprietary local bus interface or a standards-defined local bus interface. The root complex 204 may control operations of the PCIe interface 200, and may generate transaction requests for the processor 202. In some examples, the root complex 204 is implemented in the same IC device that includes the processor 202. A root complex 204 may support multiple PCIe ports.

The root complex 204 may control communication between the processor 202 the memory subsystem 208 and/or other PCIe endpoint devices 210, $212_1, 212_2, \ldots 212_N$. An endpoint device 210, $212_1, 212_2, \ldots$ or $212_N$ may be defined as a device other than the root complex 204 that is capable of requesting or initiating a PCIe transaction, or responding to a PCIe transaction. The PCIe interface 200 may support full-duplex communication between any two endpoints, with no inherent limitation on concurrent access across multiple endpoints.

Information to be communicated using the PCIe interface 200 is encapsulated in packets in accordance with PCIe bus protocols. Devices coupled to a PCIe bus may communicate using one or more PCIe lanes. A PCIe lane may be defined as a point-to-point communication channel between two PCIe ports. A PCIe lane may provide full-duplex communication and may include two differentially encoded pairs of signaling wires or signal traces, with one pair of wires being used for transmitting data and the other pair of wires being used for receiving data. Packets may carry information in eight-bit bytes. In a multi-lane PCIe link, packet data may be striped across multiple lanes. The number of lanes in the multi-lane link may be negotiated during device initialization.

Figure 3:
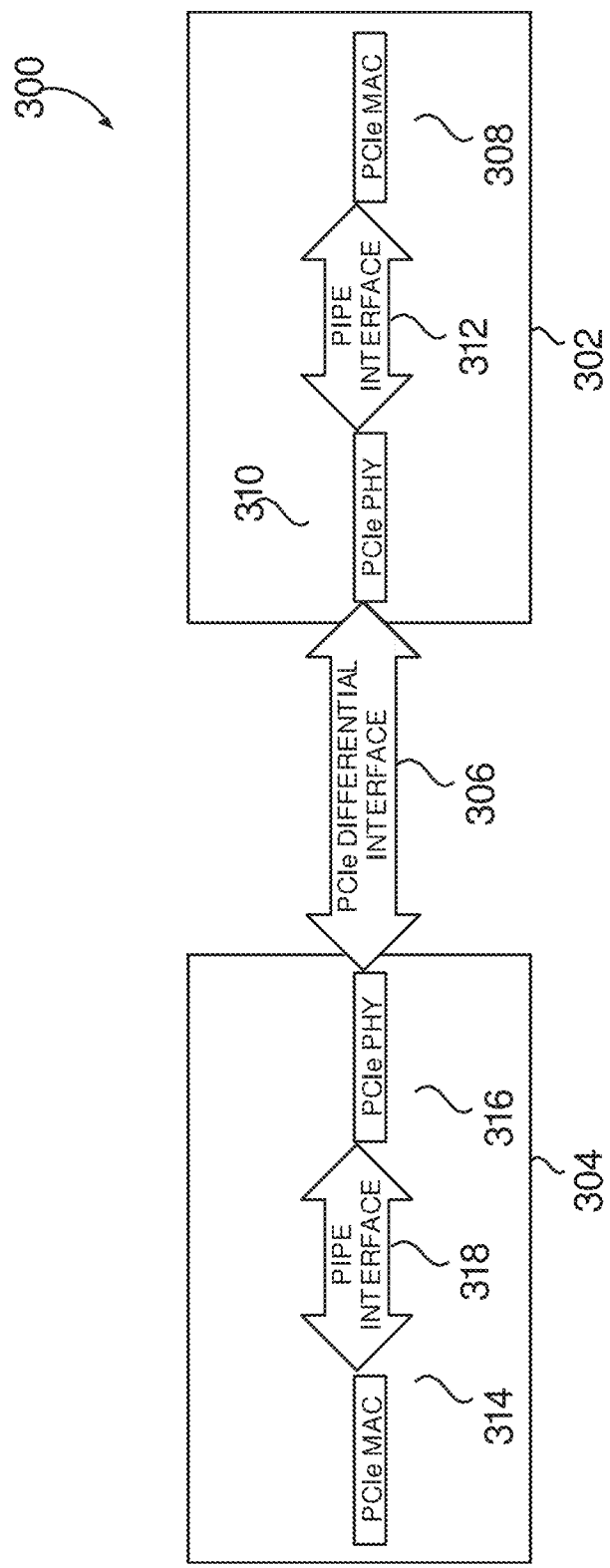
FIG. 3 illustrates a block diagram of a conventional PCIe system with two integrated circuits (ICs) coupled to one another across a PCIe bus.

FIG. 3 provides a more detailed block diagram of the components of a conventional PCIe system 300 from an integrated circuit (IC) level. In general, it is the PHY Interface for PCI Express specification ("PIPE Spec") that details the use of PCIe in a PHY environment. More specifically, figures illustrating embodiments of PHY logical structures incorporate many of the logical aspects as found in the PHY Interface for PCI Express specification. Therefore, the terms MAC, PCS and PMA will be found in the PHY Interface for PCI Express specification along with conventional features and functions. An interface (PIPE) between the PHY and MAC layers may be found in the PHY Interface for PCI Express specification, Chapter 6. The PCIe system 300 includes a first IC 302, which may be an application processor (AP) system on a chip (SOC), and a second IC 304, which may be a mobile device modem (MDM) SOC. The first IC 302 is coupled to the second IC 304 through a PCIe bus 306. The PCIe bus 306 is generally a differential bus with high speed differential signaling. The first IC 302 may include a first MAC logic 308 and a first PHY 310 coupled by a first PIPE 312. The second IC 304 may include a second MAC logic 314 and a second PHY 316 coupled by a second PIPE 318. In the conventional PCIe system 300, the first PHY 310 and the second PHY 316 are analog PHYs designed to accommodate high speed and high bandwidth.

Figure 4:
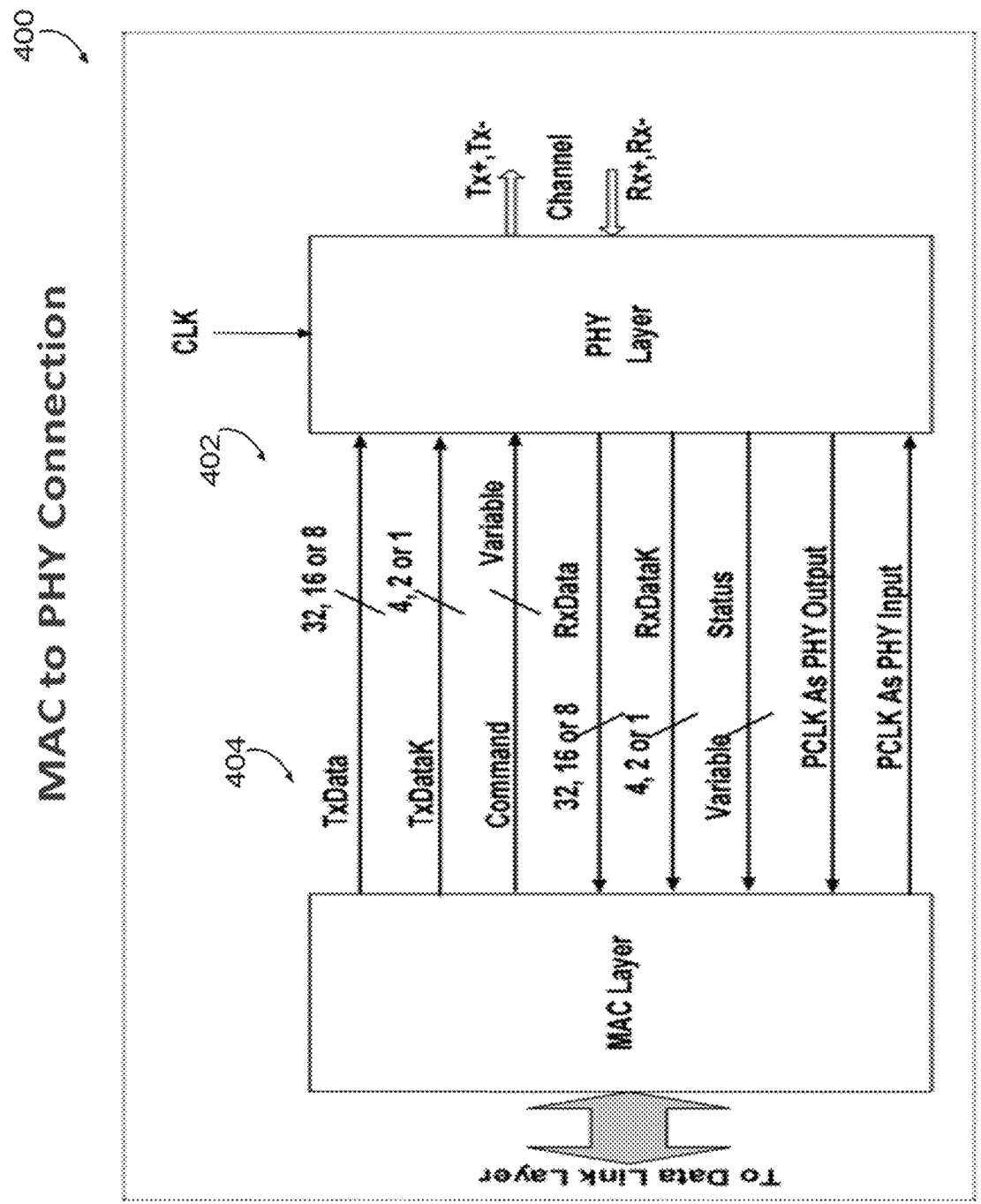
FIG. 4 illustrates a more detailed block diagram of one of the ICs of FIG. 3 having a Media Access Control (MAC) and physical layer (PHY)

FIG. 4 further illustrates an example of at least one MAC/PHY layer interface configuration of a PCIe device 400. While the "PIPE Spec" allows for various types of these interface configurations to support various signaling rates, there is a requirement that the data and logical command/status signals 402 are compliant with the "PIPE Spec," usually found in the PHY Interface for PCI Express specification, Chapter 4. The MAC layer 404 is generally responsible for at least the state machines for link training as well as Scrambling and Descrambling. The PHY layer is at least generally responsible for high speed differential signaling, encoding/decoding, clock domain and analog buffers, more detail is explained below.

Figure 5:
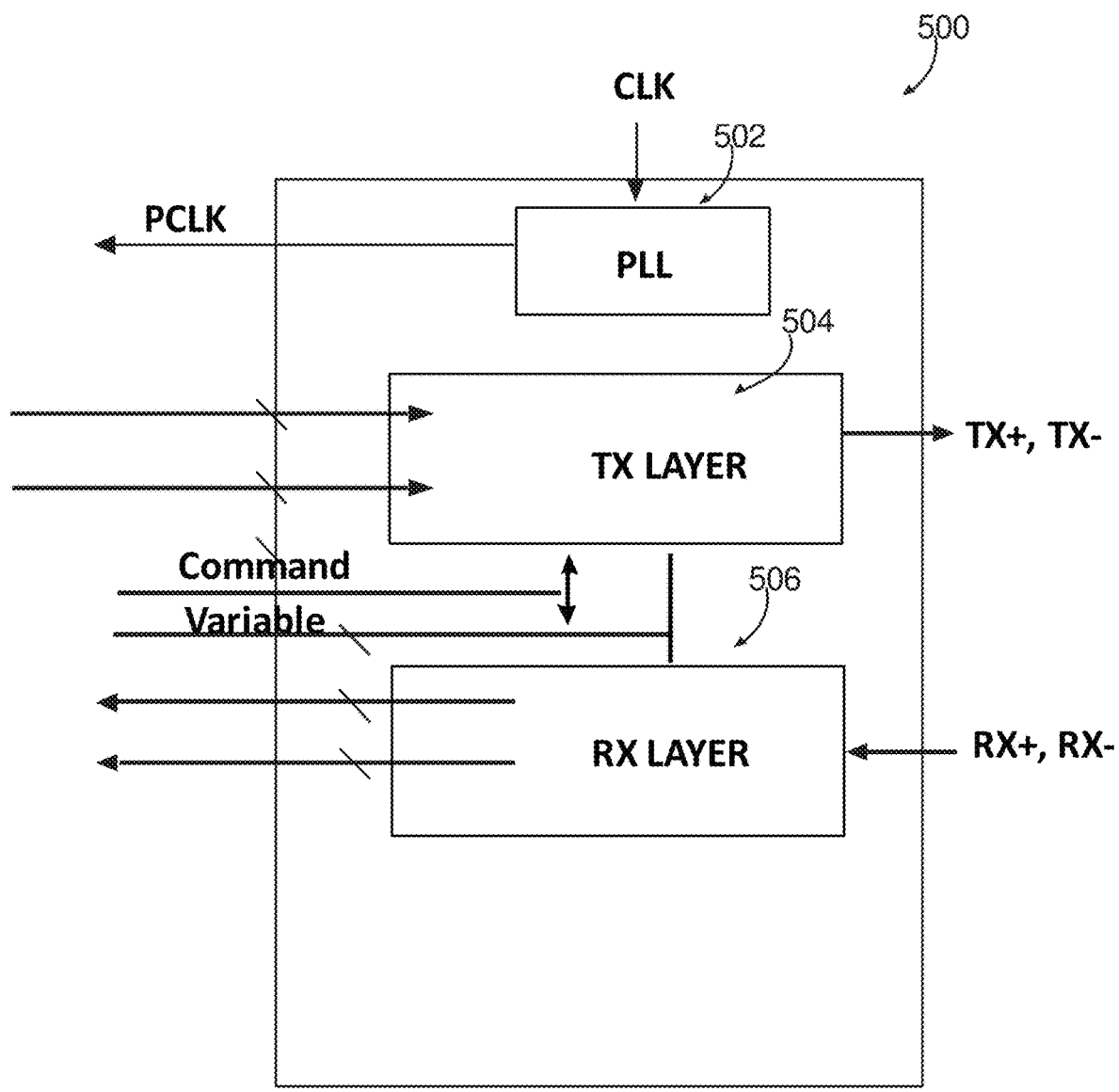
FIG. 5 illustrates a more detailed functional block diagram of one of the ICs of FIG. 3 having a PHY.
Figure 6:
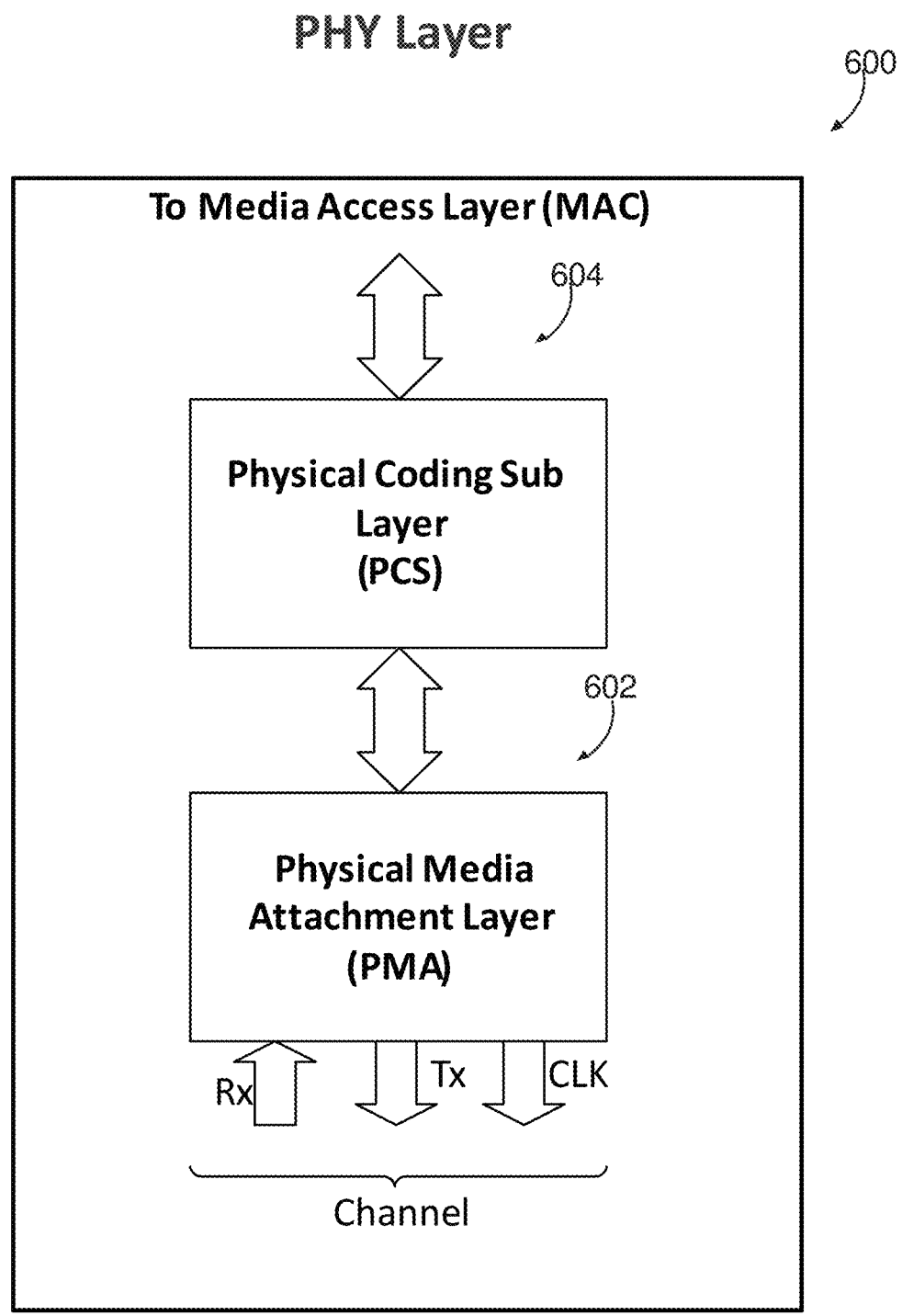
FIG. 6 illustrates another type of detailed functional block diagram of one of the ICs of FIG. 3 having a PHY.

FIGS. 5 and 6 provide a more detailed illustration of exemplary PHY layer functional blocks according to the "PIPE Spec." In FIG. 5, the PHY layer 500 functions include PLL 502, TX layer 504 and RX layer 506. In FIG. 6, the functions include the Physical Media Attachment Layer (PMA) 602, also known as the Physical Sub-Block layer and generally contains the analog buffers and SERDES. The PMA is also generally responsible for Sideband signaling and Clock management (i.e., PLL). Additional functionality is generally found in the Physical Coding Sublayer (PCS) also known as a component of the Logical Sub-block. The PCS generally contains the capability for 8b/10b or 128b/130b encode/decode as well as RX detection and an elastic buffer.

Figure 7:
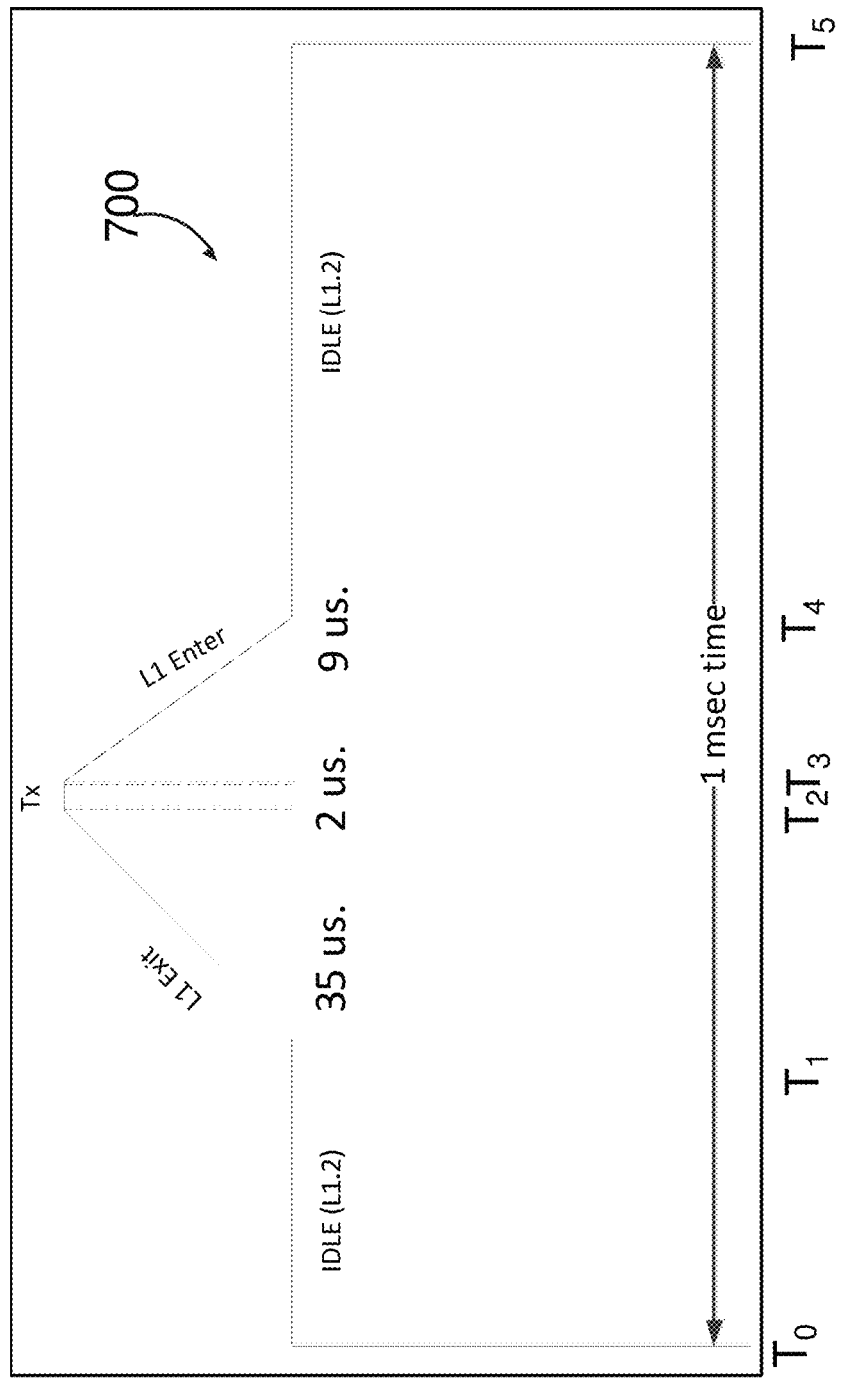
FIG. 7 illustrates a timing diagram for a PCIe IC leaving and entering an L1 low-power mode.

In practice, the PCIe system 300 (see FIG. 3) will spend some portion of the time in a low-power mode, sometimes referred to as an idle mode or L1 state and/or L1 sub-states by the PCIe protocol. When the first IC 302 needs to send a signal to the second IC 304, the PCIe system 300 is moved from the L1 state (or from one of the L1 sub-states) to an L0 state, and transmission of data signals occurs. It should be appreciated that to reduce latency, exemplary embodiments may accumulate data for no more than one or two microseconds. Therefore, the PCIe system 300 is put into the L0 state and data is sent based upon the length of time the data is accumulated, which will produce many state changes in a relatively small period of time. In some instances, the amount of data in a low-bandwidth application, such as an Internet of Things (IoT) or wearable device, may be relatively low. In such an instance, the amount of time to wake the PCIe system 300 and the amount of time spent putting the PCIe system 300 back into the L1 state (or one of the L1 sub-states) is comparatively large relative to the time spent transmitting. One millisecond of such a situation is illustrated in time graph 700 of FIG. 7, where T0 reflects the beginning of the millisecond, and the PCIe system 300 is in one of the L1 sub-states; T1 reflects when the PCIe system 300 begins to wake; T2 represents when data transmission begins; T3 represents when data transmission ends; and T4 represents when the PCIe system 300 returns to the low-power L1 sub-state mode. The time T1 to T2 reflects time spent charging capacitors and letting a PLL settles. Likewise, the time from T3 to T4 represents the time spent discharging capacitors and instructing various elements to return to the low-power L1 state (or L1 sub-state). The time from T1 to T4 may be as much tens of microseconds, which is a large portion of time and a significant power use. It is not uncommon for more than 60 percent and sometimes as much as 90 percent of the power expended by the PCIe system 300 to be spent during the transitions. Having as much as 90 percent of the power being spent during transitions is common amongst low-speed communications. Such a power consumption profile impacts battery life and is generally not needed for low-power applications. While a particular L1 sub-state is illustrated in FIG. 7, it should be appreciated that comparable situations apply to other L1 sub-states and the L1 state. Accordingly, all such low-power modes may benefit from power savings according to the present disclosure.

Figure 8:
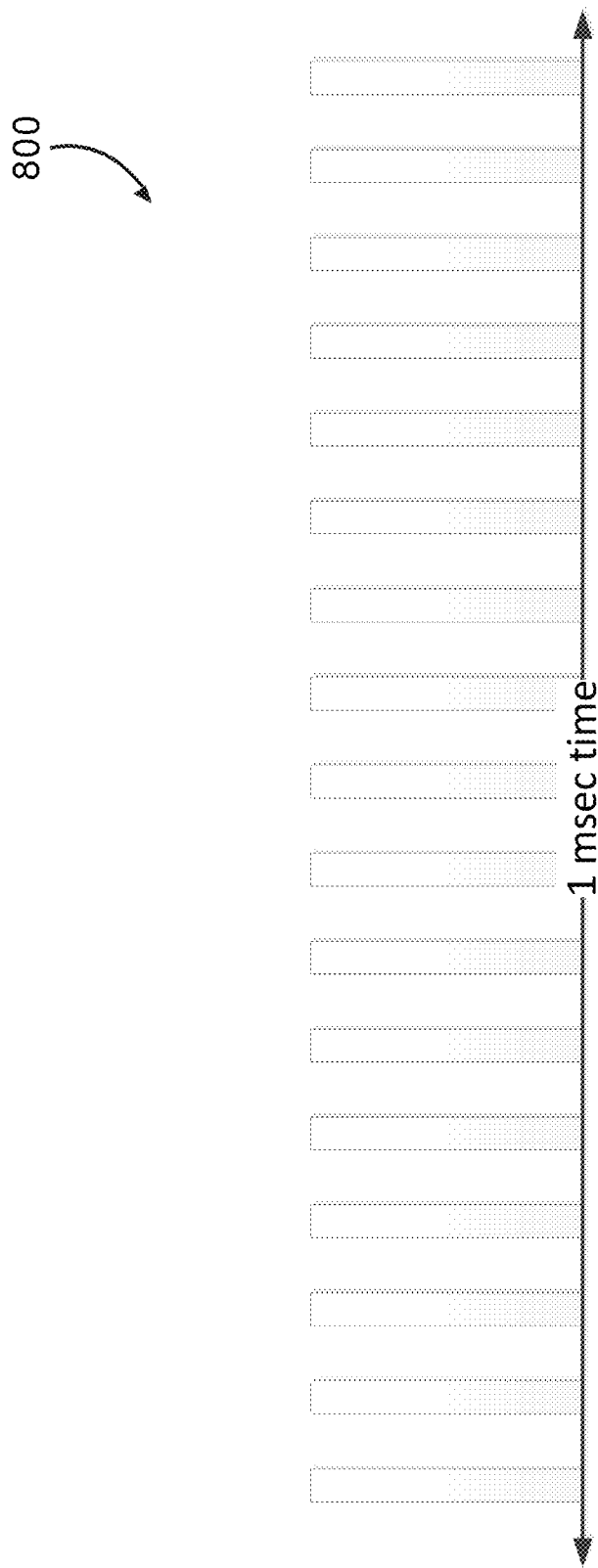
FIG. 8 illustrates an exemplary timing according to the present disclosure, when the system has entered into a single-ended signaling mode.

FIG. 8. provides an illustration of exemplary timing according to the present disclosure, when the system has entered into a single-ended signaling mode from a differential signaling mode and may have removed some or all of the functions needed for differential signaling. This illustration shows that a data rate over-the air (i.e. 1 Mbps for LTE-M) is better matched with the PCIe data rate between the application processor 132 and the modem 130. According to the present disclosure and detailed further below, this may be achieved by not using 8b/10b encoding and removing latency from charging capacitors on the bus needed for differential signaling. The single-ended signaling mode also removes the latencies of going in and out of low power mode, which may save many microseconds for each transition.

Figure 9:
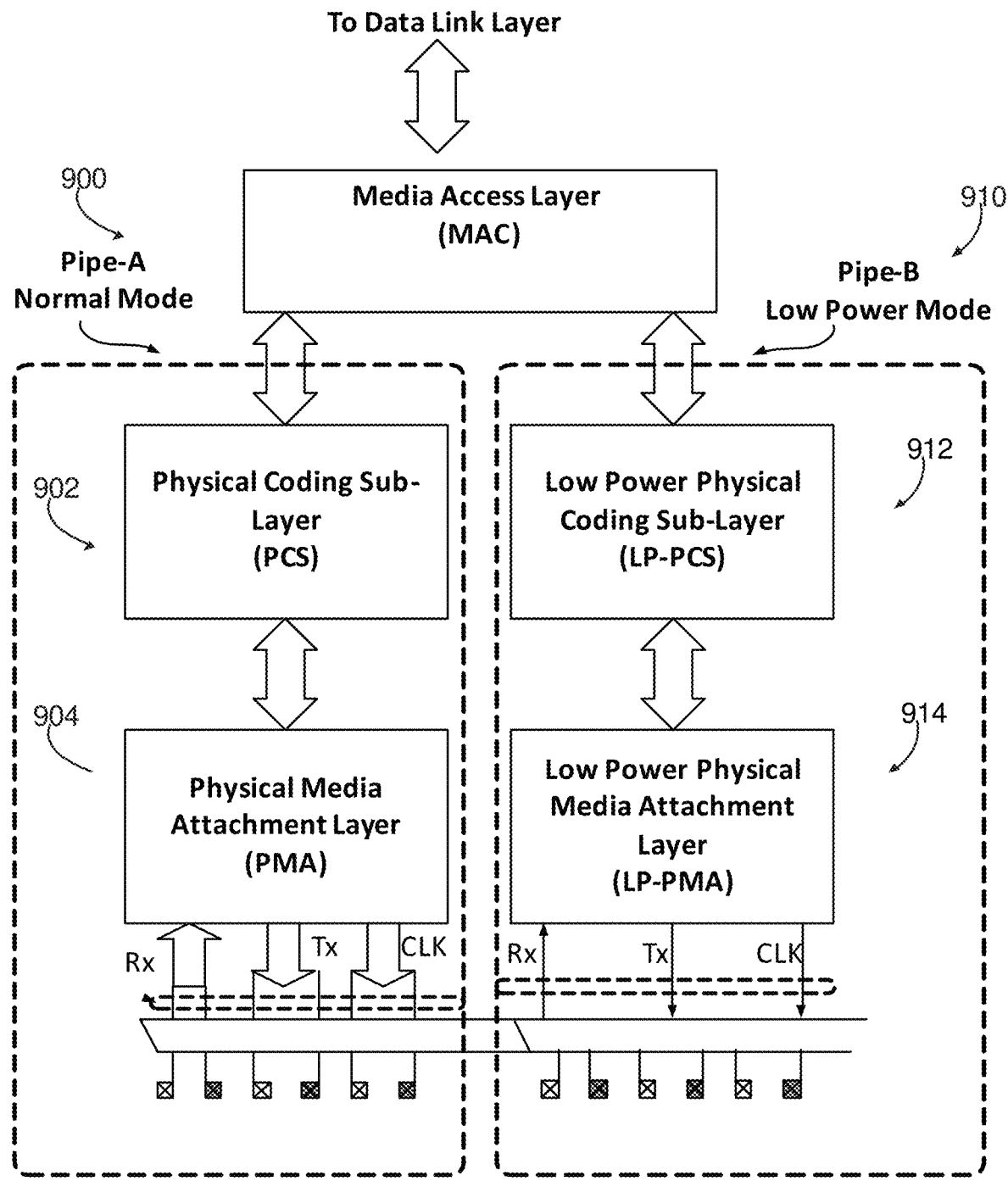
FIG. 9 illustrates a block diagram of a conventional PCIe IC PHY and a PCIe IC PHY adapted to providing a single-ended signaling mode.

In this regard, FIG. 9 illustrates a PHY layer 900 illustrating that allows for better power savings by the creation of two ancillary blocks 912, 914 in the PHY layer 910. In conventional PCIe, the clock is always 100 MHZ, therefore one would need a PLL to synthesize a higher frequency clock and the clocking is done within the data stream which means one would need clock and data recovery on the other side. Because, in a low power, single ended signaling mode, speed requirement is not as high as traditional PCIe needs, data can be sent synchronized with the clock being supplied in the single-ended signaling mode. As the clock is now synchronized, a Low Power Physical Coding Sub-Layer (LP-PCS) 912 can be configured to shut off the decode/encode circuitry, generally the biggest consumer of power in this block. Other functions may or may not be shut off. Similarly, a Low Power Physical Media Attachment Sub-Layer (LP-PMA) 914 can shut off many features, such as CLOCK and DATA recovery. In addition, Sideband signaling may be shut off. Therefore, during single ended signaling mode the LP-PMA 914 may only have a transmitter/receiver mode with buffering turned on.

Figure 10:
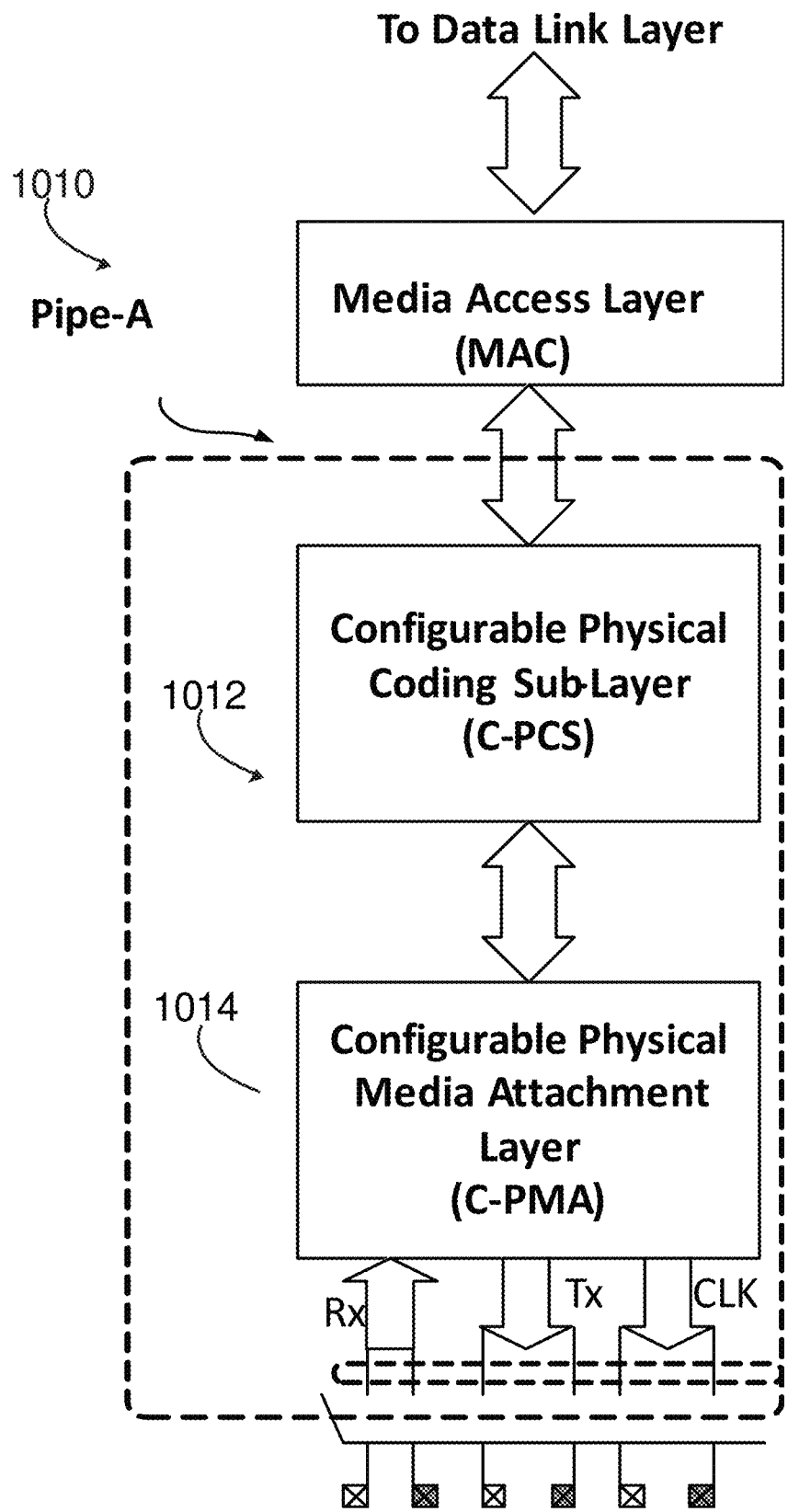
FIG. 10 illustrates a block diagram of another embodiment of a PCIe IC PHY adapted to providing both a differential and a single-ended signaling mode.

FIG. 10 illustrates another embodiment of the PHY 1010 wherein the PHY is configurable to achieve the same functionality as shown in FIG. 9, as a combination of both the normal mode PHY layer 900 and the Low Power Mode PHY layer 910. The PHY 1010 may be configured such that the Configurable Physical Sublayer (C-PCS) 1012 and the Configurable Physical Media Sublayer (C-PMA) 1014 provide the differential signaling mode, distinguished as PIPE-A (via blocks 902 904) with the functionality of the PIPE-B (via blocks 912 and 914) during single ended signaling mode.

Figure 11A:
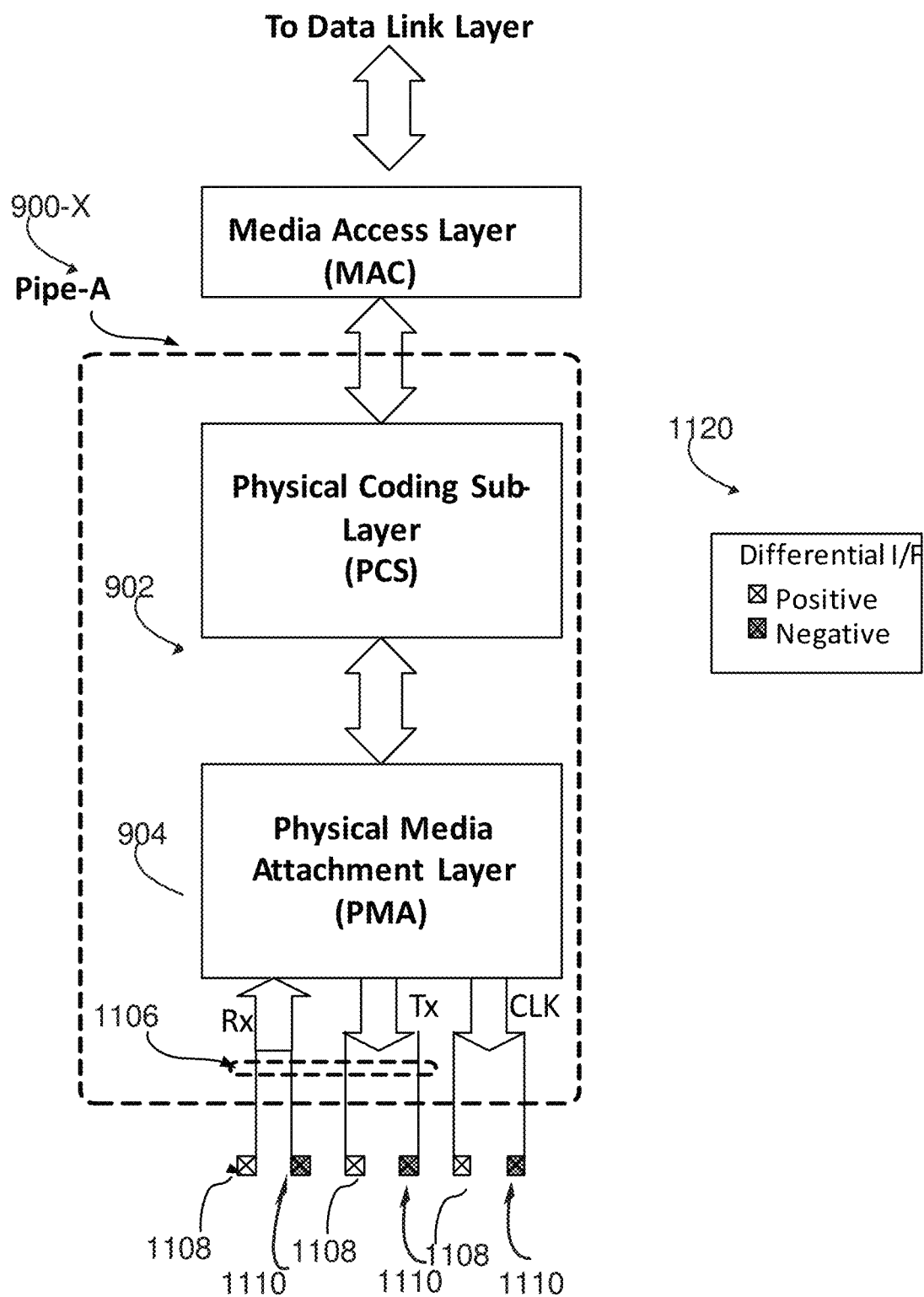
FIGS. 11A and 11B illustrates a block diagram of a conventional PCIe IC PHY and a PCIe IC PHY adapted to providing a single-ended signaling mode.
Figure 11B:
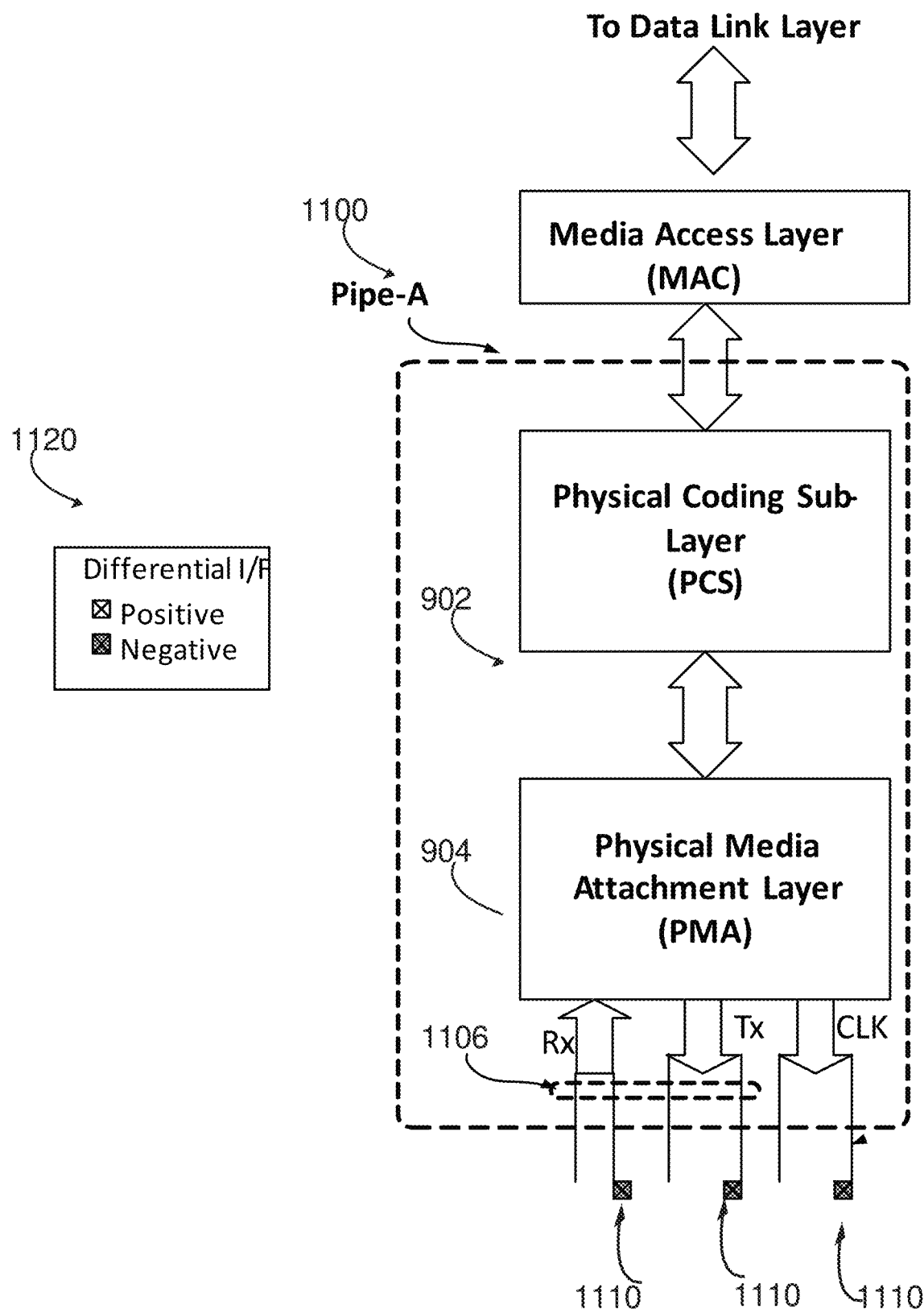

FIG. 11A illustrates another possible embodiment for power savings during a single ended signaling mode. This embodiment provides configurability at the Differential connection layer 1106 and the termination pins 1108 1110. The Differential connection layer 1106 has configurable termination pins, which can be found as the termination pins 1108 to each of the RX, TX and CLK lines. A legend 1120 distinguishes what the different termination pins mean, wherein the Positive termination pins 1108 are identified. Ordinarily, a negative termination pin is not needed. FIG. 11B illustrates the same PHY 1100 when it is "switched" to a single-ended mode. The termination pins for the RX and TX lines (and/or CLK) 1110 are grounded to negative. As further illustrated in an embodiment of FIG. 11B, while the Positive pins have been removed (in terms of functionality), they will continue to exist. For the case of the CLK line, it is also configurable, however the CLK pin will have a single-ended LVCMOS with a configurable termination pin option. This option saves power for the CLOCK line connection. For short trace length connections, differential signaling with termination could be avoided for the fixed 100 MHZ clock line.

Figure 12A:
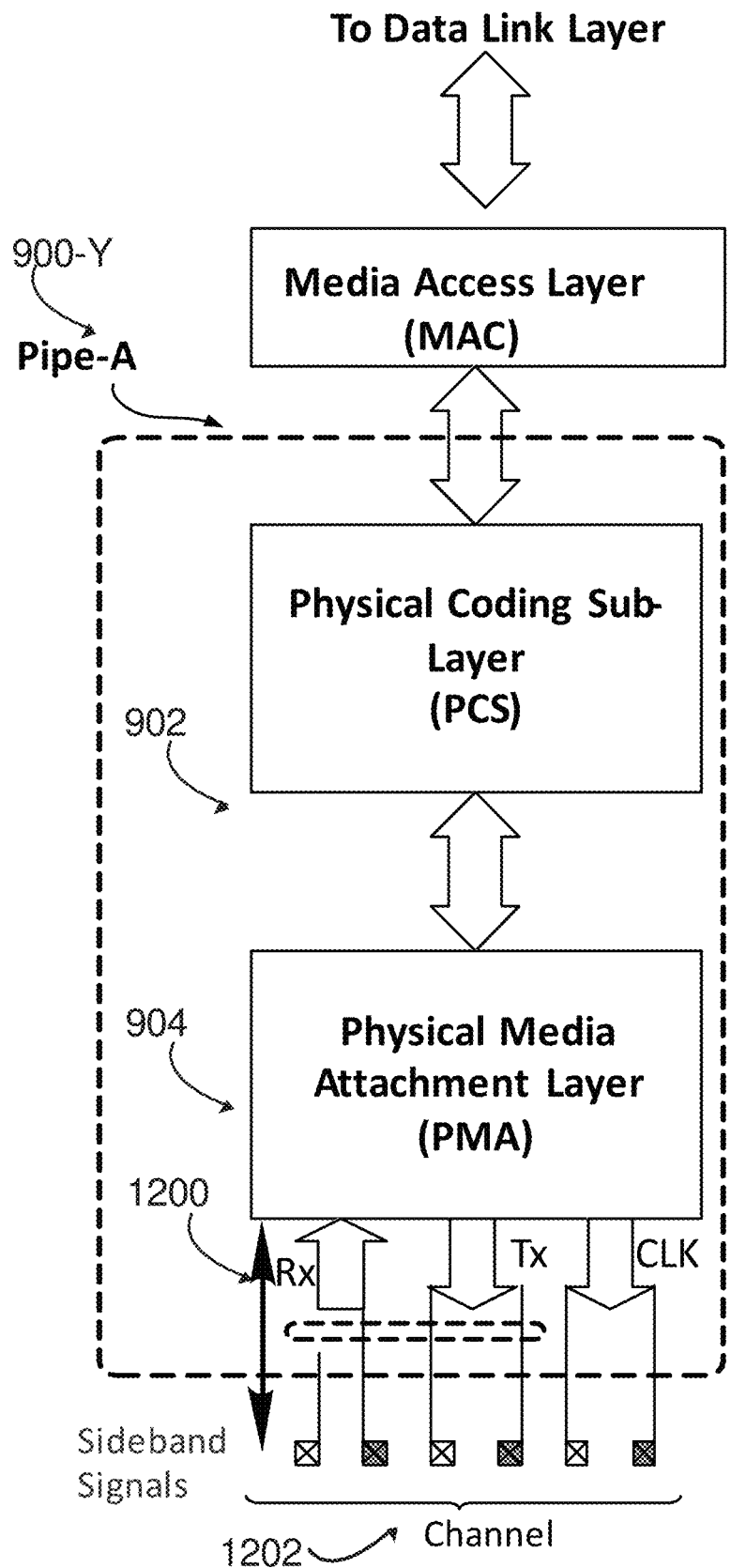
FIGS. 12A and 12B illustrates a block diagram of a conventional PCIe IC PHY and a PCIe IC PHY adapted to providing a single-ended signaling mode.
Figure 12B:
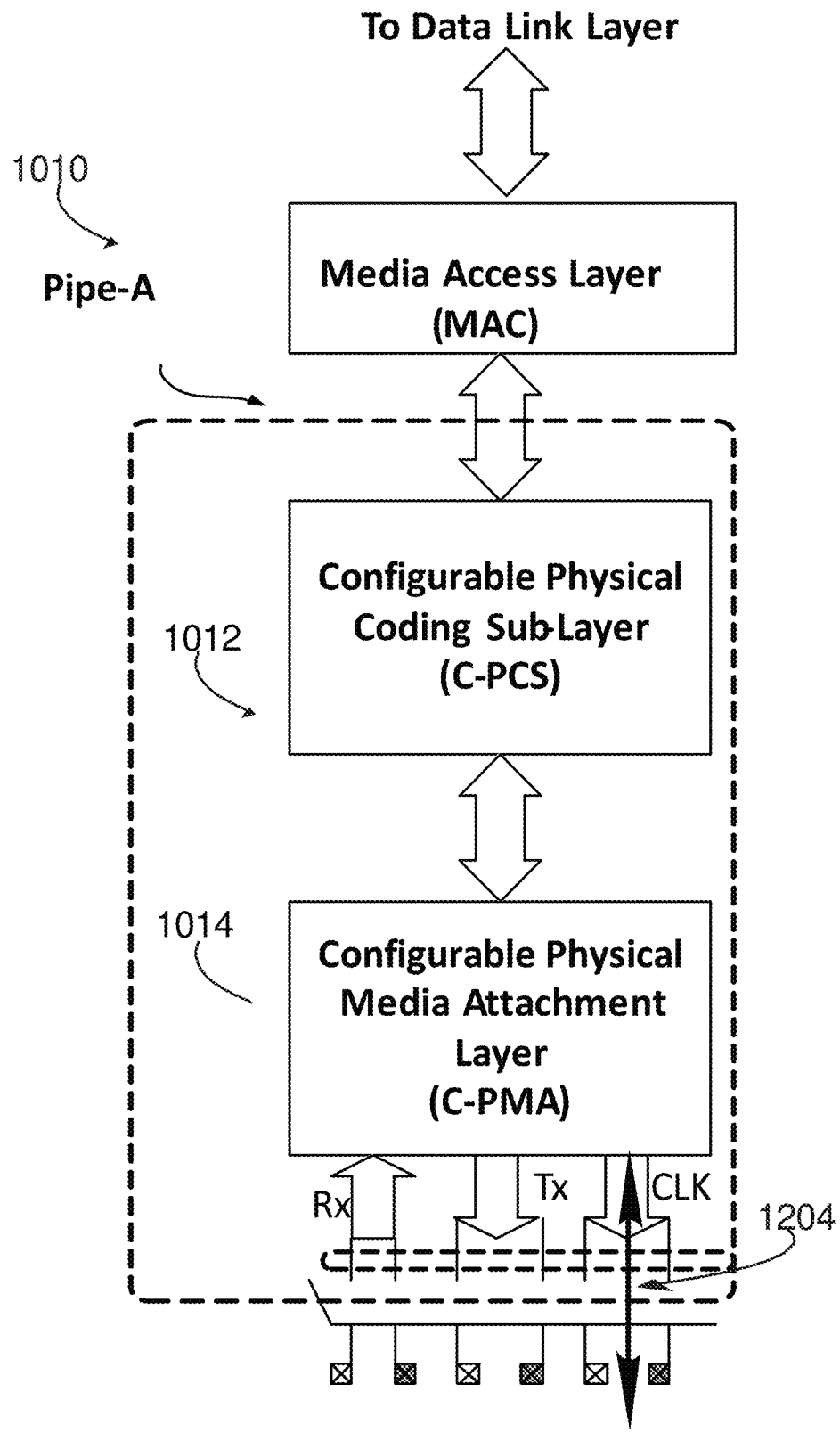

FIG. 12A illustrates yet another possible embodiment for power savings during a single ended signaling mode. In this embodiment, the Pipe-A PHY 900-Y that resembles the previously shown embodiment of Pipe-A PHY 900 of FIG. 9, has the same PCS 902 and PMA 904. The distinction that is illustrated in this embodiment has to do with configurability at the sideband signals 1200. The previously discussed communication lines of the RX, TX and CLK, as well as the sideband signals 1200, comprise what is known in PCIe as a channel 1202 that provides point-to-point communication between two PCIe ports. In this embodiment, the PCIe specific sideband signals (e.g., RESET, CLK_REQ, WAKEUP, etc.) are consolidated and handled through an in-band communication method via the singled-ended interface. To illustrate this embodiment, FIG. 12B makes use of previous FIG. 10 (configurable PHY 1010) and shows that the sideband signaling 1204 is provided through the single-ended signaling mode via the CLK line. In other embodiments, there may be variations were some sideband signals (e.g., WAKEUP) are sent only during the differential state.

Figure 13:
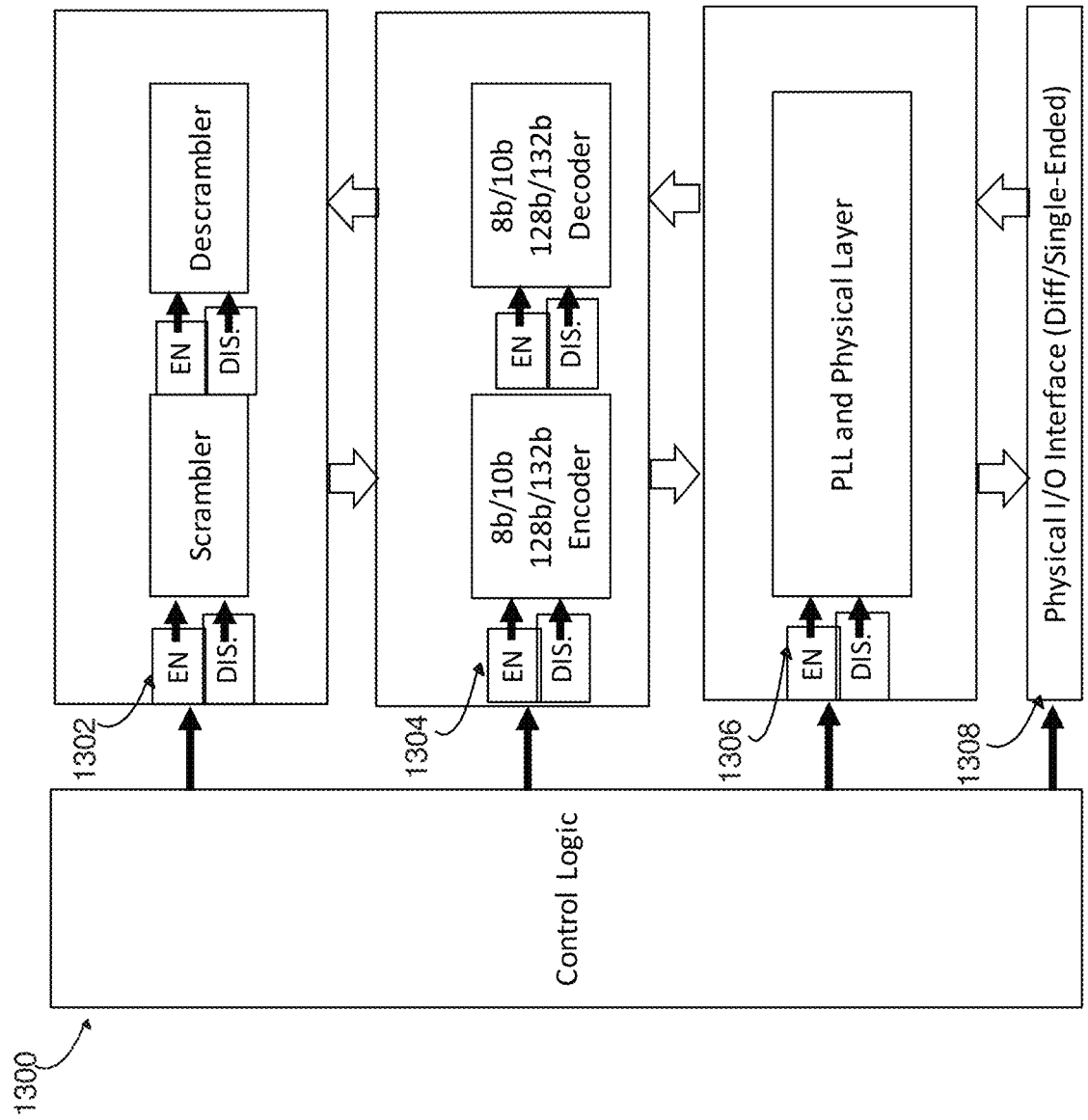
FIG. 13 illustrates an example of an architecture for a control logic capable of managing changes in the PHY for transition between differential and single-ended signaling mode.

FIG. 13 illustrates an example of an architecture for a control logic 1300 capable of managing changes in the PHY for transition between Differential and single-ended signaling mode. The control logic 1300 can be used for either managing a system similar to the embodiments illustrated in FIG. 9, FIG. 10, FIG. 11A/11B or FIG. 12A/12B or any other combinations of these embodiments, to facilitate the configuration changes needed between differential and single-ended signaling modes. Different environments may need different power savings requirements, so it is not unreasonable to assume that the embodiments can be mixed and matched as needed. It may be done as shown by control logic 1300 or some similar managing entity within the PHY layer 900. In one embodiment, the control logic 1300 may control the PMA 904 (not shown, see FIG. 9) block to facilitate either a scrambler/descrambler function 1302 being powered down or off either separately or in conjunction with a PLL function 1306 being powered down or off when transitioning from differential to single-ended signaling modes. In another embodiment, the control logic 1300 may control the PCS 902 (not shown, see FIG. 9) block to facilitate the capability for 8b/10b or 128b/130b encode/decode function 1304 being powered down or off when transitioning from differential to single-ended signaling modes. In yet another embodiment, the control logic 1300 may control a Physical I/O Interface block 1308 to facilitate the capability for the embodiment as shown in FIGS. 11A and 11B wherein the termination pins are either positive or negative depending upon their state of either differential or single-ended signaling modes. These embodiments are not meant to tie certain functions to specific PMA 904 or PCS 902 blocks or the PHY I/O interface block 1308, as the functions may be embodied in one.

Figure 14:
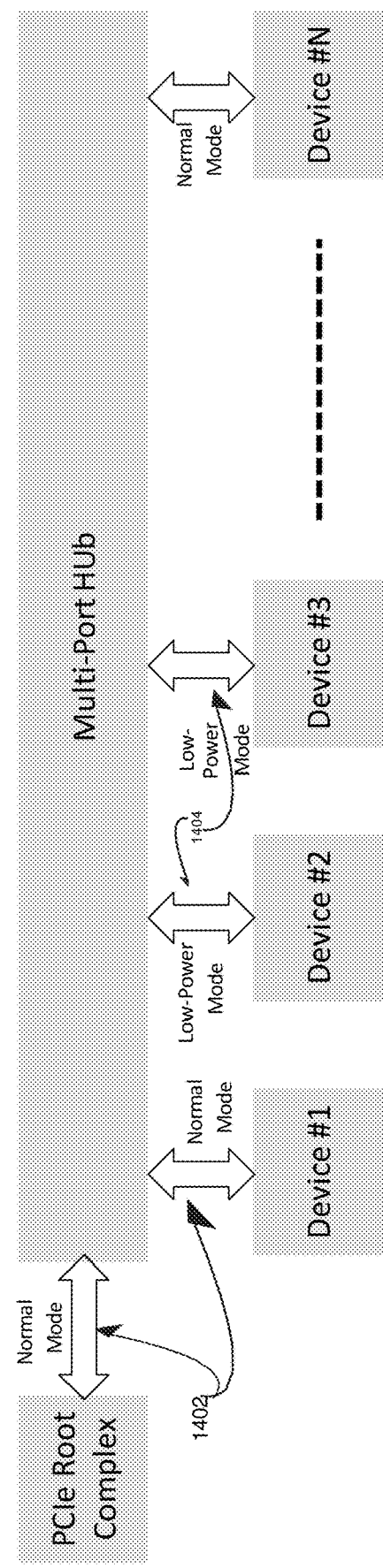
FIG. 14 illustrates an example of an architecture for a PCIe environment that contains embodiments of the disclosure.

Similar to the previous statement regarding the mixing and matching of different power saving embodiments, the same can be applied at a macro level. FIG. 14 illustrates the ability of the disclosure to be used at a system wide PCIe environment wherein any number of devices may be active in either a normal mode 1402 or low-power mode 1404 (through the use of the single-ended signaling embodiments).

Figure 15:
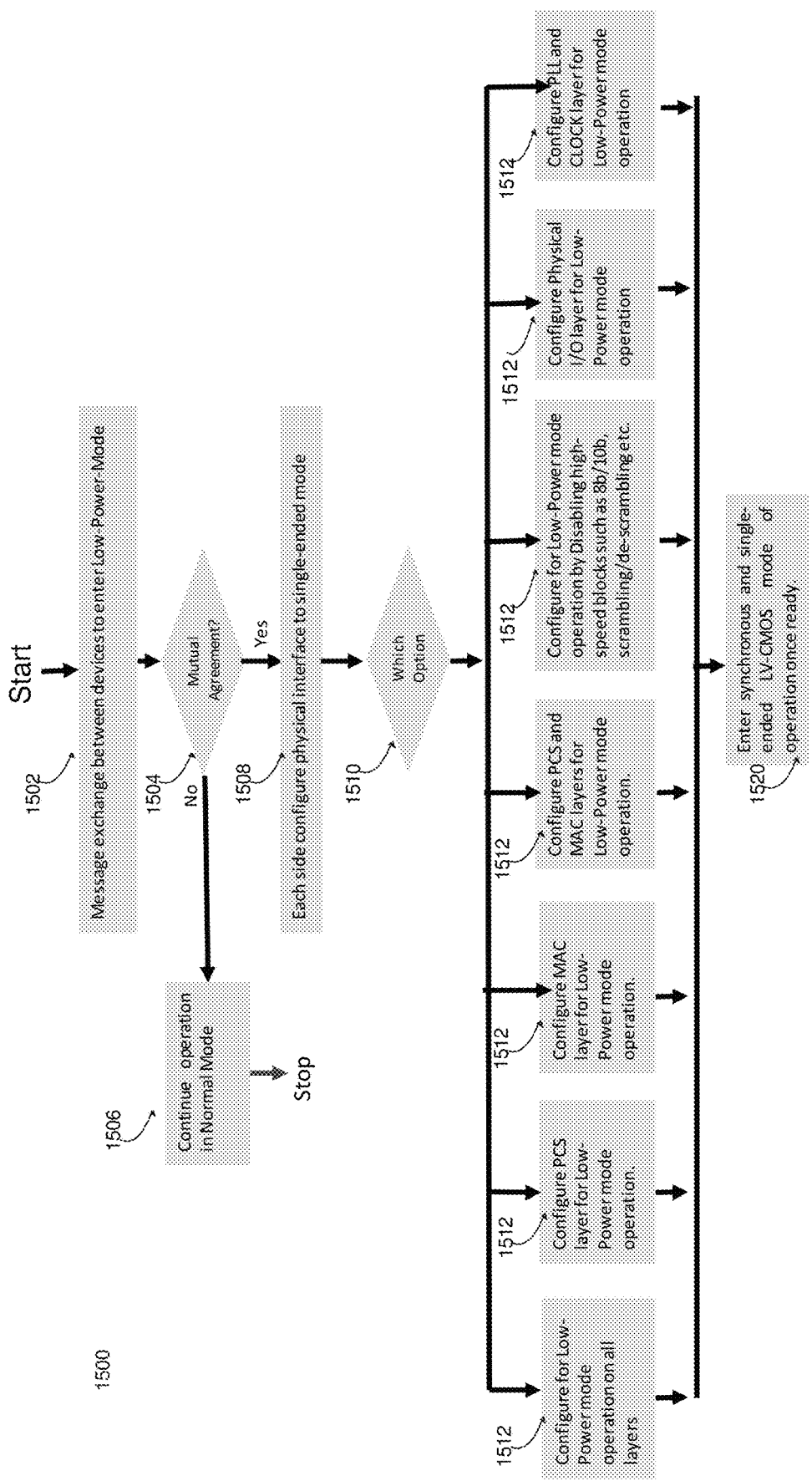
FIG. 15 is a flowchart illustrating a process for using the PCIe PHY to provide a low power single-ended signaling mode in numerous exemplary manners.

FIG. 15 provides a flowchart of process 1500 associated with using the PHY layer 500 of FIG. 5 according to an exemplary aspect of the present disclosure. The process 1500 begins by exchanging messages 1502 between devices that need to communicate with each other through PCIe protocol to determine if a low power mode is capable and if so, which one. If there is not mutual agreement between the pair of devices that are planning on exchanging data or they are incompatible with one another regarding which low power state is available 1504, the devices may continue on with normal full power mode 1506. There are other conditions wherein there may not be mutual agreement, e.g., the receiving side may want to receive more data at a higher speed.

If the two devices do agree to a low-power mode 1508, each side will have to correspondingly configure respective PHY layer 900 to the low-power mode that was agreed by both 1510. While FIG. 15 provides a variety of illustrations of exemplary combinations of low power modes 1512 to enable single-ended signaling as described or shown in this disclosure, this is not meant to be an exhaustive list. It is just an illustration of the varied number of low power scenarios for single-ended signaling that are available according to the disclosure. Once the intended low power option is operational, the PHY layer 900 will enter the single-ended signaling state to either send or receive in this mode 1520.

While the present disclosure assumes that the techniques used herein may be used as a power-saving technique, it should be appreciated that the present disclosure is not mutually exclusive of other power-saving techniques and may be used with hierarchical devices and/or the use of a switch.

The embodiments disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

As presented above, the examples may achieve power-saving by switching between a differential a single-ended PCIe signaling. Clock rate may be reduced, and single-ended PCIe signaling reduces complexity in circuitry in the control block. In such fashion, the PCIe PHY may be put in an always-ready state (e.g., eliminating start-up and shut-down time and power cost).

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An integrated circuit (IC) adapted to be connected to Peripheral Component Interconnect (PCI) Express (PCIe) bus, comprising:
   a PCIe physical layer (PHY) coupled to the PCIe bus; and
   a PHY interface for PCI Express (PIPE):
   configured to select between differential signaling and single-ended signaling for the PCIe bus,
   wherein the single-ended signaling is transmitted through existing pins of the IC that are coupled to the PCIe bus for differential signaling when single-ended signaling is selected for the PCIe bus,
   the PHY comprising:
   a Physical Coding Sub-Layer (PCS);
   a Physical Media Attachment Layer (PMA);
   a control logic layer; and
   wherein the PIPE is operable to cause the control logic layer to switch between the differential signaling and the single-ended signaling for the PCIe bus.

2. The IC of claim 1, wherein the PIPE is configured to select between the differential signaling and the single-ended signaling based on a throughput estimation or a battery status.

3. The IC of claim 1, wherein the IC is in a PCIe system that comprises devices in both the differential signaling and the single-ended signaling.

4. The IC of claim 1 integrated into a device selected from a group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

5. An apparatus having an integrated circuit (IC) adapted to be connected to a Peripheral Component Interconnect (PCI) Express (PCIe) bus, the IC comprising:
   a PHY interface for PCI Express (PIPE) configured to select between differential and single-ended signaling for the PCIe bus,
   wherein the single-ended signaling is transmitted through existing pins of the IC that are coupled to the PCIe bus for differential signaling when single-ended signaling is selected for the PCIe bus,
   wherein the PIPE is operable to switch PCIe side-band signaling to in-band signaling when single-ended signaling is selected for the PCIe bus, through the existing pins via which the single-ended signaling is transmitted.

6. The apparatus of claim 5, wherein the PIPE comprising a hardware circuit, software, or a combination of hardware and software.

7. The apparatus of claim 5, wherein the PIPE is configured to select between the differential and the single-ended signaling for the PCIe bus based on at least a throughput estimation or a battery status.

8. The apparatus of claim 5, further comprising a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter, wherein the device incorporates the IC.

9. An integrated circuit (IC) adapted to be connected to Peripheral Component Interconnect (PCI) Express (PCIe) bus, comprising:
   a PCIe physical layer (PHY) coupled to the PCIe bus; and
   a PHY interface for PCI Express (PIPE) comprising:
   configured to select between differential signaling and single-ended signaling for the PCIe bus,
   wherein the single-ended signaling is transmitted through existing pins of the IC that are coupled to the PCIe bus for differential signaling when single-ended signaling is selected for the PCIe bus,
   the PHY comprising:
   a first Physical Coding Sub-Layer (PCS) and a first Physical Media Attachment Layer (PMA) that perform the differential signaling; and
   a second Physical Coding Sub-Layer (PCS) and a second Physical Media Attachment Layer (PMA) that perform the single-ended signaling;
   wherein the PIPE is operable to select the first PCS for the differential signaling and to select the second PCS for the single-ended signaling.

10. The IC of claim 9, wherein the PIPE terminates to ground all channel communication lines in at least one termination mode.

11. A method performed at an integrated circuit (IC) optimized for power savings coupled to a Peripheral Component Interconnect (PCI) Express (PCIe) bus, comprising:
    receiving a request to enter a single-ended signaling mode;
    sending an indicator of a mode of single-ended signaling mode to be used by the IC;
    entering into the mode of single-ended signaling mode;
    transmitting over single-ended signaling mode; and
    switching PCIe side-band signaling to in-band signaling when single-ended signaling is selected for the PCIe bus, through existing pins via which the single-ended signaling is transmitted.

12. An integrated circuit (IC) adapted to be connected to Peripheral Component Interconnect (PCI) Express (PCIe) bus, comprising:
    a PCIe physical layer (PHY) coupled to the PCIe bus; and
    a PHY interface for PCI Express (PIPE):
    configured to select between differential signaling and single-ended signaling for the PCIe bus, wherein the single-ended signaling is transmitted through existing pins of the IC that are coupled to the PCIe bus for differential signaling when single-ended signaling is selected for the PCIe bus, the PHY comprising:

a first Configurable Physical Coding Sub-Layer (C-PCS) and a first Configurable Physical Media Attachment Layer (C-PMA) that perform both the differential signaling and the single-ended signaling; and wherein the PIPE is operable to cause the first C-PCS to switch between the differential signaling and the single-ended signaling.

13. An integrated circuit (IC) adapted to be connected to Peripheral Component Interconnect (PCI) Express (PCIe) bus, comprising:

a PCIe physical layer (PHY) coupled to the PCIe bus; and a PHY interface for PCI Express (PIPE):

configured to select between differential signaling and single-ended signaling for the PCIe bus, wherein the single-ended signaling is transmitted through existing pins of the IC that are coupled to the PCIe bus for differential signaling when single-ended signaling is selected for the PCIe bus, the PHY comprising:

a Physical Coding Sub-Layer (PCS);

a Physical Media Attachment Layer (PMA);

a differential layer;

a clock generator; and wherein the PIPE is configured to:

switch each of the one or more termination pins between a positive termination mode and a negative termination mode.

* * * * *